May 19, 1970 — C. M. MAHONEY — 3,513,410
LASER BEAM POWER DENSITY CONTROL FOR Q-SWITCHING
Filed Oct. 10, 1967

INVENTOR.
CORNELIUS MICHAEL MAHONEY
BY Elliott & Pastoriza
ATTORNEYS

United States Patent Office 3,513,410
Patented May 19, 1970

3,513,410
LASER BEAM POWER DENSITY CONTROL FOR Q-SWITCHING
Cornelius Michael Mahoney, Pacific Palisades, Calif., assignor to Union Carbide Corporation, a corporation of New York
Filed Oct. 10, 1967, Ser. No. 674,284
Int. Cl. H01s 3/11
U.S. Cl. 331—94.5                                   5 Claims

ABSTRACT OF THE DISCLOSURE

Means are provided for controlling the power density in a portion of a laser beam impinging on a Q-switching device disposed in the optical cavity of a laser system. Variation in power density impinging on the Q-switching device is effected by causing a portion of the beam to converge by optical lenses and then properly positioning the Q-switching device so as to intercept a desired cross-sectional portion of the converging beam in accord with the desired power density to be intercepted by the Q-switching device.

---

This invention relates generally to lasers and more particularly to solid state giant pulse lasers incorporating passive Q-switching means in the optical cavity wherein a control is provided for enabling adjustment of the power density of the laser beam impinging on the Q-switching means.

Giant pulse lasers incorporating passive Q-switching means such as dye cells wherein the present invention finds utility are shown in copending patent application Ser. No. 364,169, filed May 1, 1964, and entitled Light Control Means for Use With a Giant Pulse Laser. In these systems, the dye cell Q-switch is disposed in the optical cavity and is essentially opaque to laser radiation thus "spoiling" the Q of the optical cavity during pumping of the laser rod. As a consequence, the inverted population level of ions established in the rod by the light pumping source may be greatly increased over the inverted levels possible in the absence of a "Q-spoiling" device. However, when the population inversion reaches a given high ratio, some initial lasering action will take place and the impingement of the beam on the dye cell Q-switch bleaches the dye to render the same transparent. When the dye cell becomes substantially transparent to the radiation, the Q of the optical cavity is restored and lasering action takes place resulting in a "giant pulse" of laser radiation.

The time at which the dye cell changes from an opaque to a transparent condition is a function of the power density of laser radiation impinging on the dye cell. Thus, assuming that the parameters of the dye cell itself, for example, the dye concentration, can be maintained constant, Q-switching can be consistently effected at a given desired power density. In practice, however, it is found that the dye in the cell tends to decay with time and thus the effective dye concentration varies. As a result, the power density at which Q-switching will occur will vary with a consequent variation in the magnitude of giant pulses generated.

To overcome the foregoing problem, the dye cells have been made with open tops so that additional dye may be added to the solution to compensate for dye decay. While utilizing such open top dye cells facilitates the adjustment of the dye concentration, the dye itself is at all times exposed to air resulting in more rapid decay of the dye than would otherwise result with a closed dye cell. Utilizing a sealed dye cell will inhibit dye decay but there still results a decay and with a sealed cell, additional dye cannot be added. Further, changes in other parameters of the cavity can occur such that the power density required for switching is not easily predictable.

The lack of control over the giant pulses generated by a giant pulse laser when employing a passive Q-switch means as described can create problems in certain laser applications. For example, a change in the power density required to switch the Q-cell can result in possible double laser pulses being passed from the laser system which would seriously interfere with distance measurement when the laser is employed in the manner of a radar system. Further, if the giant pulses are employed for material removal, variations in the magnitude of the giant pulses can result in variations in the amount of material removed with the result of a lack of proper control during the removal operation.

With all of the foregoing considerations in mind, it is a primary object of the present invention to provide a unique and novel apparatus for enabling an adjustment of the power density of the laser beam impinging on a passive Q-switching means to compensate for dye decay or other changes in the cell parameters which would affect the time of the Q-switching.

Another object is to provide apparatus meeting the foregoing object to the end that a closed dye cell may be incorporated as the Q-switch means such that the necessary compensation for dye decay is minimal.

Briefly, these and other objects and advantages of this invention are attained by altering the beam angle of at least a portion of the laser beam such that the cross-section area of the portion has different values for different positions along the axis of the laser beam. The Q-switching device, which may constitute a dye cell, is then positioned along the axis of the beam in the optical cavity to intercept a cross-sectional area of the beam at which a desired power density impinges on the Q-switching means to cause switching thereof. By this arrangement, as the dye in the Q-switching cell decays, the cell itself may be physically moved along the axis of the beam to a position in which the power density of the beam impinging on the cell is decreased thus compensating for the dye decay and permitting the generation of giant pulses of the same magnitude as were provided before the dye decay occurred.

A better understanding of the invention will be had by now referring to the accompanying drawings, in which.

Figure 1:
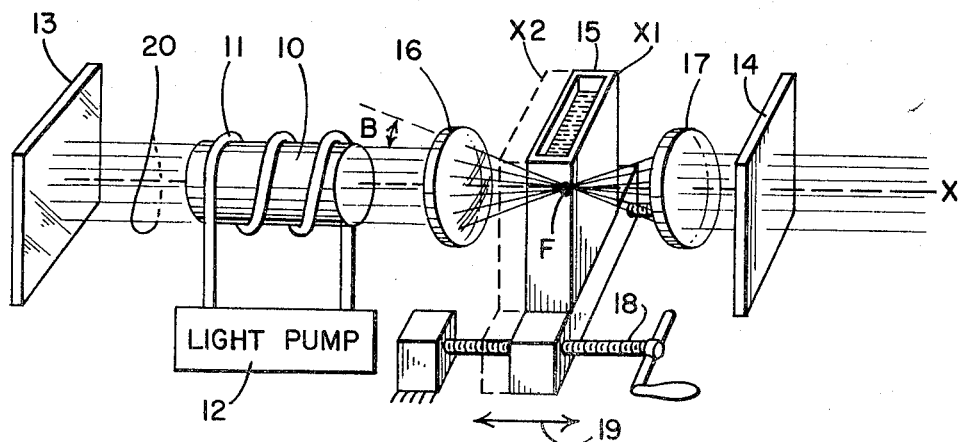
FIG. 1 is a schematic perspective of a solid state giant pulse laser system incorporating the power density control system of this invention.

Referring first to FIG. 1 there is shown a solid state giant pulse laser system including a laser rod or crystal 10 which may constitute ruby surrounded by a spiral flash lamp 11. The lamp 11 is powered from a light pump source 12. Suitable end mirrors 13 and 14 are positioned on either side of the laser rod 10 as shown and serve to define an optical cavity for enabling the stimulated emission of radiation from the rod to take place. The end mirror 13 is 100% reflecting and the end mirror 14 may be partially reflecting to permit the laser light to pass from the system.

Included in the laser cavity is a passive Q-switching means in the form of a dye cell 15 containing a suitable dye solution such as shown and described in the heretofore referred to copending patent application Ser. No. 364,169.

In the operation of the system described thus far in FIG. 1, the laser rod 10 is light pumped by the spiral flash lamp 11 to cause an inverted population of the lasering ions. Any lasering action is inhibited by the presence of the dye cell 15 which is substantially opaque to passage of laser light along the axis of the rod. As continued pumping of light energy into the rod takes place, an initial lasering action will occur and impingement of the beam on the dye cell 15 will attain a power density such as to cause bleaching of the dye rendering the cell transparent. At this point, the Q of the laser cavity between the end mirrors 13 and 14 is restored and the regenerative action can take place as the lasering ions fall back from their inverted state to their ground state or at an intermediate level depending upon a particular laser involved. A giant laser pulse of light is thus released and passes through the partially reflecting end mirror 14.

The exact time at which the dye cell 15 "switches" is determined by the power density of the initial beam impinging on the dye cell and the concentration of dye employed in the cell. With a cell as illustrated in FIG. 1, decay of the dye will result in cellswitching occurring sooner since less power density is required. Thus, as the cell becomes less effective due to decay, the magnitude of the output giant pulses will decrease. As mentioned, this variation has been compensated for heretofore by simply adding further dye to the cell solution.

In accord with the present invention, the decay of the dye or other factors affecting the efficiency of the Q-switching device are compensated for by controlling the power density of the laser beam impinging on the cell. In accord with the first embodiment of the invention illustrated in FIG. 1, this is achieved by providing optical means in the form of lenses 16 and 17 disposed on opposite sides of the cell 15. Preferably, these lenses are convex and have a common focal point F intermediate the lenses and close to the position of the dye cell as illustrated in FIG. 1.

The dye cell 15 in turn is mounted on a suitable means which will enable movement of the dye cell along the axis of the beam. This axis is designated X in FIG. 1. The mounting may take any desirable form and for purposes of illustration there is provided a simple lead screw 18 threaded within a mounting base for the cell such that rotation of the lead screw will effect the desired linear movement of the cell along the X axis in one direction or the other as indicated by the double headed arrow 19.

The laser beam is shown at 20 and the convex lens 16 alters the beam angle of the laser beam by converging the beam as illustrated. The new beam angle is designated by the letter B in FIG. 1. As a consequence of the converging angle of the beam, its cross-sectional area at various positions along the X axis will vary. Thus, the cross-sectional area intercepted by the Q-switching cell 15 will vary depending upon its position along the beam axis. The power density of the beam impinging on the cell, of course, is a direct function of the cross-sectional area of the beam intercepted by the cell.

Figure 2:
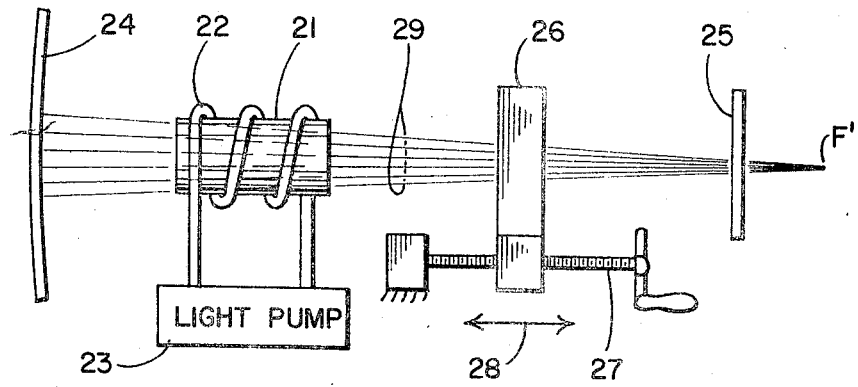
FIG. 2 is a schematic elevational view of a second embodiment of the invention.

FIG. 2 shows a second embodiment of the invention wherein the optical lens structure for altering the beam angle of the beam to provide the desired variable cross section defines one of the end reflecting mirrors for the optical cavity. Thus as shown in FIG. 2, there is provided a laser rod 21 surrounded by a spiral flash lamp 22 powered from a light pump source 23. Rather than an optically flat end mirror to the left of the laser rod, there is provided a concave mirror 24 cooperating with a flat mirror 25 to define the optical cavity. The Q-switching dye cell is illustrated at 26 positioned between the end mirror 25 and laser beam generating rod 21. A suitable mounting means such as a lead screw 27 is provided to enable movement of the cell 26 back and forth along the X axis of the beam as indicated by the double headed arrow 28.

In the embodiment of FIG. 2, it will be noted that the focal point for the concave mirror 24 falls outside of the laser cavity as at F' to the right of the end mirror 25. The portion of beam between the laser rod and end mirror 25 however has a variable cross section with changes in distance along the X axis so that a desired power density may be caused to impinge upon the Q-switching means 26 by shifting the cell position all as described in FIG. 1.

Figure 3:
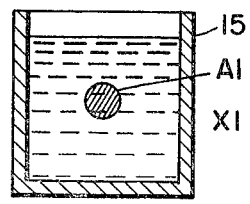
FIG. 3 is a schematic front view of the Q-switching cell in the embodiment of FIG. 1 in a first position.
Figure 4:
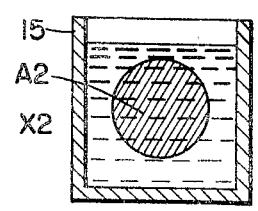
FIG. 4 is a view similar to FIG. 3 but illustrating the Q-switching cell in a second position; and, FIG. 5 is a qualitative plot illustrating double pulses from the laser system, useful in explaining certain advantages of the invention.

The above will be clearer by reference to FIGS. 3 and 4.

In FIG. 3, there is shown the Q-switch cell 15 of FIG. 1 wherein the cross-sectional area of the laser beam impinging upon the cell is designated A1, this area corresponding to a position X1 along the X axis of the laser beam as adjusted by the lead screw 18. FIG. 4 illustrates the cross-sectional area of the beam intercepted by the dye cell when the same is moved along the X axis to the position X2 shown in dotted lines in FIG. 1. It will be noted that the area A2 of the intercepted beam is considerably larger than the area A1 so that the power density impinging upon the cell 15 is correspondingly less.

When the dye cell 26 of the FIG. 2 embodiment is moved towards the left, the intercepted area will increase but the rate of change of this area will be less since the beam angle in the embodiment of FIG. 2 is less than that in FIG. 1.

In operation, the dye cell 15 in FIG. 1 or 26 in FIG. 2 will be positioned to intercept a small area of the laser beam and thus would be initially positioned in the solid line position X1 in FIG. 1 or further to the right in FIG. 2. The impinging area would be substantially as shown at A1 in FIG. 3.

The laser may then be operated in the usual manner and giant pulses will be generated, the power of these pulses being a function of the time at which Q-switching occurs. As an example, and with reference to FIG. 5, the giant pulse may be as indicated at 30 having a power output P1.

After a period of time, the dye in the switching cell will decay and not be as effective in its switching operation. In other words, switching will occur with less power density on the cell with the result the pulses will be released prematurely. Rather than adding more dye as is the usual manner of compensating for this dye decay, the dye switching cell may simply be moved along the X axis away from the focal point so as to increase the intercepted area of the beam. The power density impinging on the cell will thus be decreased and switching can be made to occur at a time to provide a consistent output pulse of power P1 such as shown in 30 in FIG. 5 without having to change the dye solution.

Since compensation for dye decay is effected by simple physical movement of the dye cell in order to change the power density of the beam impinging on the cell, it is not necessary to employ an open ended cell. A closed and sealed cell such as illustrated in FIG. 2 may be used and any dye decay will be considerably inhibited since there is no exposure to the atmosphere.

Figure 5:
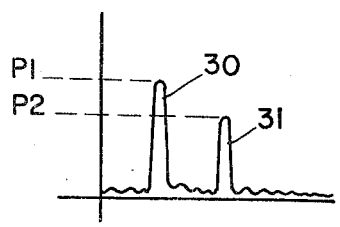

A further important advantage of the present invention resides in the fact that the switching time can be adjusted such that only a pulse of magnitude greater than the magnitude of a second pulse 31 shown in FIG. 5 will effect triggering. This feature is desirable to prevent a double pulse from being passed from the laser. If a double pulse were allowed to pass from the laser system, there would be an ambiguity in the distance reading when the laser is used as a radar system. Thus the ability to adjust power density in accord with the present invention has further advantages over simple compensation for dye decay.

From the foregoing, it will be evident that the various objects of this invention have been fully realized by the apparatus described.

What is claimed is:

1. A laser system including, in combination: a laser medium for generating a laser beam; first and second end mirrors defining an optical cavity for said laser beam; a Q-switching means disposed in said optical cavity to intercept said beam, said optical cavity including optical means for altering the beam angle of at least a portion of said laser beam such that the cross-sectional area of said portion has different values for different positions along the axis of said portion of said beam; and mounting means for mounting said Q-switching means for movement along said axis whereby said Q-switching means may be moved along said axis to a position in which the intercepted cross-sectional area of said beam by said Q-switching means has a desired power density.

2. The subject matter of claim 1, in which said optical means includes at least one optical lens positioned along the axis of said beam between said Q-switching means and said laser medium in said laser system to receive said beam and pass a beam of altered beam angle to define said portion.

3. The subject matter of claim 2, in which said one lens is convex; and an additional convex lens positioned along the axis of said beam on the opposite side of said Q-switching means with its focal point coincident with the focal point of said one lens such that said Q-switching means is positionable between said one lens and said additional lens close to the common focal points of said lens, said additional lens altering said beam portion back to its original beam angle.

4. The subject matter of claim 1, in which said optical means comprises a curved mirror defining one end reflecting means for said optical cavity.

5. The subject matter of claim 4, in which said mirror is concave with its focal point lying outside said optical cavity.

References Cited

UNITED STATES PATENTS

| | | | |
|---|---|---|---|
| 3,013,467 | 12/1961 | Minsky | 356—203 |
| 3,289,099 | 11/1966 | Masters | 331—94.5 |
| 3,365,678 | 1/1968 | Maurer | 331—94.5 |
| 3,433,555 | 3/1969 | Tomlinson | 331—94.5 |

RONALD L. WIBERT, Primary Examiner

W. L. SIKES, Assistant Examiner

U.S. Cl. X.R.

350—160, 267